United States Patent [19]

Ninomiya et al.

[11] Patent Number: 4,774,532

[45] Date of Patent: Sep. 27, 1988

[54] LASER PLATE-MAKING APPARATUS

[75] Inventors: Yuki Ninomiya, Soka; Susumu Takahashi, Satte; Yasukazu Ono, Saitama, all of Japan

[73] Assignee: Toppan Printing Co., Ltd., Tokyo, Japan

[21] Appl. No.: 116,338

[22] Filed: Nov. 4, 1987

[30] Foreign Application Priority Data

Nov. 7, 1986 [JP] Japan .......................... 61-171191[U]
Nov. 29, 1986 [JP] Japan .......................... 61-284915

[51] Int. Cl.[4] .......................... G01J 15/00

[52] U.S. Cl. .......................... 346/160; 346/150

[58] Field of Search .......................... 346/160, 107 R, 108, 346/105, 76 PH, 150, 76 R, 154; 355/10, 3 R; 400/119, 120; 101/DIG. 13, 467, 470, 463.1; 358/300

[56] References Cited

U.S. PATENT DOCUMENTS 3,876,445 4/1975 Goffe .......................... 346/150
3,935,327 1/1976 Taylor .......................... 346/150

FOREIGN PATENT DOCUMENTS 60-40360 3/1985 Japan .
60-43668 3/1985 Japan .

*Primary Examiner*—Arthur G. Evans
*Attorney, Agent, or Firm*—Bacon & Thomas

[57] ABSTRACT

A laser plate-making apparatus includes a moisture-proof paper feed magazine for feeding plate materials one by one, each having a photosensitive layer, a charger for charging the plate material with an electric charge, an exposing unit for exposing the plate material charged with the electric charge, using a laser beam modulated in accordance with a plate-making image to partially neutralize the electric charge and form an electrostatic latent image, a developing unit for developing the electrostatic latent image by applying a developing solution to the plate material, the developing unit being located at the lowest position in a convey path, and including an arcuated pair of electrodes through which the plate material passes and to which a predetermined voltage is applied, a developing solution concentration sensor having detachable special cells and using a light-emitting diode, and a squeezing roller pair for squeezing out an excess developing solution from the developed plate material, the developing solution being sprayed on a surface of the squeezing roller to prevent the surface thereof from being dried, a fixing unit for drying the developed plate material with hot air, and fixing the developed plate-making image.

29 Claims, 8 Drawing Sheets

LASER PLATE-MAKING APPARATUS

BACKGROUND OF THE INVENTION

The present invention relates to a laser plate-making apparatus for exposing a plate material made of a photoconductive sheet using a laser beam, and developing it by an electrophotographic process.

Conventional laser plate-making apparatuses of such a type are disclosed in, e.g., Japanese Patent Disclosures (Kokai) Nos. 60-40360 and 60-043668. In the laser plate-making apparatuses described in these prior art, a plurality of convey roller pairs form a convey path for a plate material, and a charger, an exposing unit, a developing unit, and a fixing unit are sequentially arranged on the convey path.

Generally, for miniaturization of the overall apparatus, i.e., for shortening the length of the convey path, the charger, the exposing unit, the developing unit, and the fixing unit are arranged to be adjacent to each other. Therefore, a length of the convey path is set to reach one and half times the length of the photoconductive sheet as a plate material. For this reason, when the plate material passes through the exposing unit, the leading end of the plate material may reach the fixing unit, or sometimes the outside of the apparatus. At least one convey roller pair is arranged between the exposing unit and the developing unit, and at least one convey roller pair is also arranged between the developing unit and the fixing unit. Consequently, the leading end of the photoconductive sheet passes between a number of convey roller pairs during exposure. While scanning a surface of the photoconductive sheet using a laser beam (in a direction orthogonal to the convey path), the exposing unit turns on/off the laser beam in accordance with image data of an original so as to form an electrostatic latent image on the sheet. Therefore, it is required that the photoconductive sheet during exposure is conveyed at a speed as constant as possible while flatness thereof is kept. Although each roller of the convey roller pairs is made of an elastic material, the leading end of the photoconductive sheet receives a slight impact when it is clamped by each convey roller pair. As a result, the photoconductive sheet is slightly vibrated, and hence flatness thereof cannot be kept. Besides, the convey speed slightly changes when the leading end of the photoconductive sheet is clamped by the convey roller pair. Consequently, when an electrostatic latent image is to be formed, a slight positional error is caused, resulting in degradation in image quality.

Furthermore, the positional error is caused by other reasons. Since the developing unit stores a developing solution, it is disposed at the lowest position in the convey path. More specifically, the convey path goes down to the developing unit, goes up therefrom, and hence the convey path is bent at the position of the developing unit. The photoconductive sheet is bent when it passes through the developing unit, and hence it is difficult for the sheet to smoothly pass through the developing unit. This unsmooth passing through the developing unit slightly vibrates the photoconductive sheet. As a result, flatness of the sheet cannot be maintained and the convey speed slightly changes.

In order to keep the photoconductive sheet flat during exposure and to quickly discharge the charges neutralized by the laser beam, a conductive support base is arranged under a part of the convey path, which is irradiated with the laser beam. A large number of fine holes are formed in the surface of the conductive support base, and a suction mechanism is coupled to these holes. During exposure, the photoconductive sheet is sucked toward the support base, thereby keeping the surface of the photoconductive sheet flat. A fan blower or an air pump may be used as the suction mechanism. In any case, a size thereof is relatively large, and it does not provide an effect to satisfy the requirement for miniaturization of the apparatus.

The photoconductive sheet is designed such that an undercoat is formed under a photosensitive layer, a base (paper) is arranged thereunder, and a back coat is formed thereunder. The photosensitive layer is charged with the positive electric charge by a charger, and the positive charge thereon is neutralized upon radiation of the laser beam by the exposing unit, thereby forming the electrostatic latent image. In this case, in order to neutralize the positive electric charge, electrons generated by the laser beam need to be allowed to move freely inside the sheet to some degree. For this purpose, the sheet must have an appropriate low electric resistance. Therefore, the sheet need have appropriate moisture.

In this case, a plurality of photoconductive sheets are stored in a paper feed magazine, and arranged to be fed one by one. A conventional magazine does not have a drying prevention function. For this reason, if the magazine is kept set in the apparatus for a long period of time, the sheet is inevitably dried due to the ambient humidity, thereby increasing the resistance due to evaporation of the moisture.

Fixation is performed by drying. Conventionally, a heater is arranged near the convey path, and air is blown by a fan to perform drying. However, the air blown from the fan is not warm air, but cool air, and hence efficiency is undesirably degraded. Furthermore, flatness of the sheet is sometimes adversely affected by the blown air, resulting in a loss of flatness.

Prior to drying, some of the developing solution is squeezed out by a squeezing roller pair from the photoconductive sheet which has passed through the developing unit. If the surface of the lower roller of the squeezing roller pair is dried, toner contained in the developing solution may adhere thereto. Therefore, a portion of the developing solution should always be sprayed on the surface of the lower roller to keep it wet. However, the sheet may be splashed with the developing solution or the developing solution may be sprayed on a dryer, depending on the force or direction of the spray of the developing solution.

Conventionally, in order to regularly measure a concentration of the developing solution, a densitometer is arranged inside the developing solution tank. However, the conventional densitometer cannot be easily cleaned if a light-emitting or light-receiving face thereof is soiled. In addition, since a tungsten bulb is used as a light-emitting portion, a considerably long preparation time is required to start measurement.

SUMMARY OF THE INVENTION

It is an object of the present invention to provide a compact laser plate-making apparatus capable of producing a high-quality image.

It is another object of the present invention to provide a laser plate-making apparatus wherein a plate material is not vibrated during exposure.

It is still another object of the present invention to provide a laser plate-making apparatus wherein even if a gradient of a convey path for a plate material is changed at a position of a developing unit, the plate material can smoothly pass through the developing unit.

It is still another object of the present invention to provide a laser plate-making apparatus which stores a plurality of plate materials in a feed magazine to feed the plate materials one by one therefrom to a main body of the apparatus, capable of preventing the plate materials from being dried even if the feed magazine is kept set inside the main body for a long period of time.

It is still another object of the present invention to provide a laser plate-making apparatus capable of preventing toner from adhering to surfaces of a lower roller of the squeezing roller pair, arranged between a developing unit and a fixing unit to squeeze out a developing solution to some degree, by preventing drying of the surface thereof and also capable of preventing the developing solution from being sprayed on any portion which should not be sprayed.

It is still another object of the present invention to provide a laser plate-making apparatus wherein flatness of a plate material is not lost during drying with air, while the plate material can be efficiently dried in a fixing unit for fixing an image by drying the wet plate material with a developing solution.

It is still another object of the present invention to provide a laser plate-making apparatus capable of easily measuring a concentration of a developing solution in a developing unit, and quickly cleaning a measuring device when it is soiled.

A laser plate-making apparatus according to the present invention comprises a moistureproof paper feed magazine for feeding plate materials each having a photosensitive layer; a charger for charging the plate material fed from the paper feed magazine with an electric charge; an exposing unit for exposing the the plate material charged with the electric charge with a laser beam modulated in accordance with a plate-making image to partially neutralize the electric charge, thereby forming an electrostatic latent image; a developing unit for developing the electrostatic latent image by applying a developing solution while the plate material passes by an opposing pair of arcuated electrodes applied with a predetermined voltage, the developing unit including a developing solution concentration sensor having a special cell detachably arranged therein and a light-emitting diode and a squeezing roller pair for squeezing out excess developing solution from the developed plate material, the developing solution being sprayed on surfaces of the squeezing roller pair; a fixing unit for drying the developed plate material with hot air so as to fix the developed plate-making image; and a plurality of convey roller pairs for sequentially moving the plate material fed from the paper feed magazine, through the charger, the exposing unit, the developing unit, and the fixing unit in the order named, two rollers of each roller pair being separated from each other immediately before the plate material is clamped, and being brought into contact with each other after the plate material is set at a clamping position.

DETAILED DESCRIPTION OF THE PREFERRED EMBODIMENT

An embodiment of a laser plate-making apparatus according to the present invention will be described in detail with reference to the accompanying drawings hereinafter.

Figure 1:
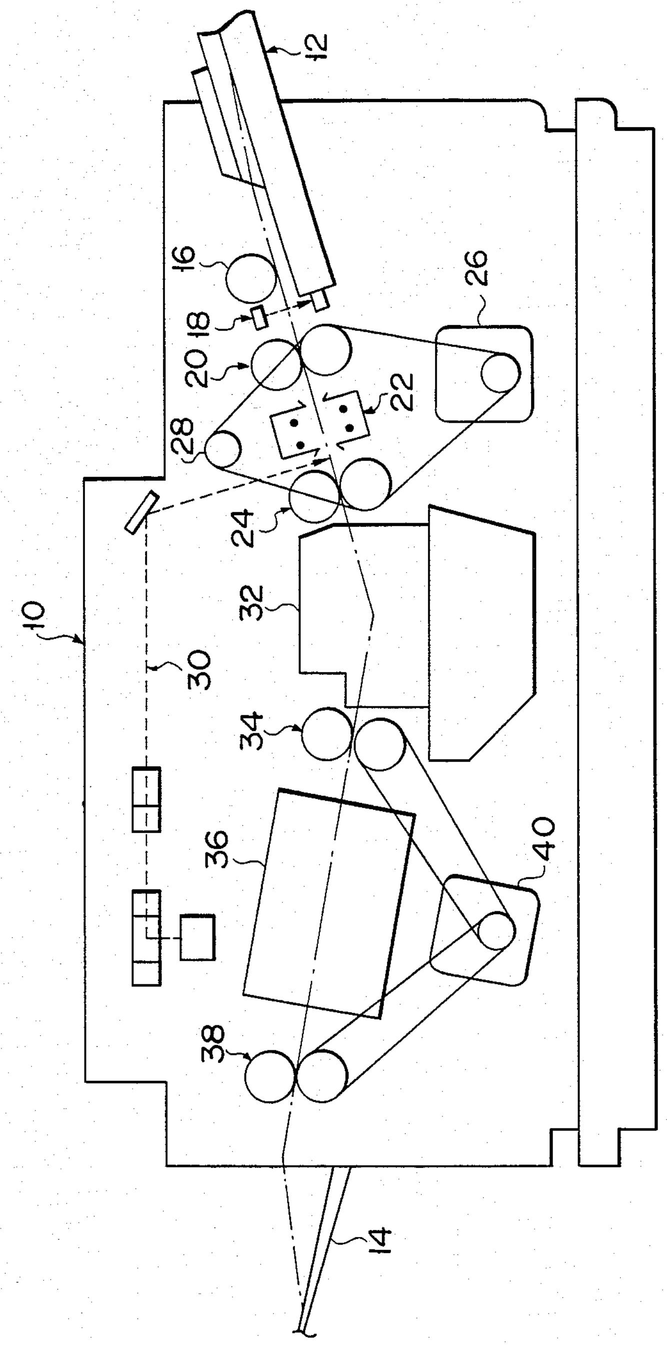
FIG. 1 is a schematic sectional front view showing an embodiment of a laser plate-making apparatus according to the present invention.

FIG. 1 is a sectional front view. Paper feed magazine 12 is detachably mounted in a right side wall of main body 10, and discharge tray 14 is arranged on a left side wall of main body 10. A photoconductive sheet as a plate material is clamped by a plurality of roller pairs and conveyed from the right to the left through main body 10, and charged with the electric charge, exposed, developed, and fixed in the order named. A convey path is indicated by an alternate long and short dashed line.

The plate materials are taken out from paper feed magazine 12 one by one by pickup roller 16 (or picked up by an air suction system). Each plate material is clamped by first convey roller pair 20 forming a convey mechanism through leading end sensor 18 and moved forward along the convey path. Side guides (not shown) are arranged on the both sides of the convey path in front of first convey roller pair 20 to accurately control a position of the conveyed plate material in a width direction thereof. Leading end sensor 18 is formed by a photointerruptor. A detection timing of sensor 18 serves as a reference for each operation timing of the parts.

Charger 20 and second convey roller pair 24 are arranged at the downstream side of first convey roller pair 20. Charger 22 charges a surface of the plate material with electric charge (positive charge in this embodiment). Charger 22 may charge the plate material with a negative charge, depending on the characteristic of the photoconductive material. The double-charge method for charging the plate material from the upper and lower surfaces thereof is employed as a method of charging. The lower rollers of first and second convey roller pairs 20 and 24 are integrally driven by motor 26. The upper rollers of first and second convey roller pairs 20 and 24 are rotated upon rotation of the lower rollers, respectively. To stably rotate the rollers, a looped belt is wound around the corresponding lower roller of first and second convey rollers 20 and 24, a rotary shaft of motor 26, and free roller 28 located above the convey path.

In this case, first and second convey roller pairs 20 and 24 have a one-way slip mechanism and second convey roller pair 24 are rotated at a speed slightly higher than that of first convey roller pair 20. A tension is applied to the plate material between first and second convey roller pairs 20 and 24, thereby keeping flatness of the plate material during charging and exposure, keeping the moving speed constant, and reducing irregular charging and irregular exposure.

Laser exposing unit 30 is arranged on an upper portion of main body 10. Laser exposing unit 30 scans the plate material in the width direction thereof between charger 22 and second convey roller pair 24 using a laser beam, and exposes the upper surface of the plate material. The electric charge of an exposed portion of the plate material is neutralized by electrons excited by the laser beam.

The plate material which has passed through second convey roller pair 24 is supplied to developing unit 32. The wet developing method is employed as a method of delopment, wherein a developing solution containing toner is applied to the plate material from the upper side, thereby performing development.

After development, the developing solution applied to the plate material is squeezed out by roller pair 34 to such an extent that the developed image is not destroyed. Thereafter, the plate material is conveyed to fixing unit 36. A method of fixing is a method of drying the developing solution with hot air.

After fixing, the plate material is discharged from main body 10 by discharge roller pair 38, and stacked on discharge tray 14. Squeezing roller pair 34 and discharge roller pair 38 are integrally rotated by motor 40.

Figure 2:
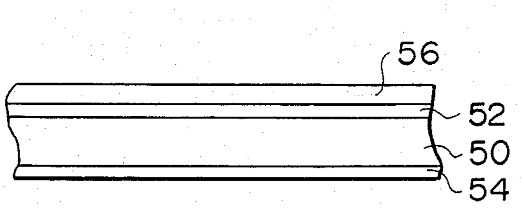
FIG. 2 is a sectional view of a photoconductive sheet as a plate material used for the laser plate-making apparatus according to the present invention.

FIG. 2 shows a sectional view of the plate material (photoconductive sheet). Undercoat 52 is formed on the upper surface of base 50 made of paper, back coat 54 is formed on the lower surface thereof, and zinc oxide photosensitive layer 56 is formed on the upper surface of undercoat 52. Photosensitive layer 56 is most sensitive to a light beam having a wavelength of about 780 nm. The overall thickness of the photosensitive sheet is 140 to 160 μm. Photosensitive layer 56 may be formed of copper phthalocyanine and zinc oxide.

Figure 3:
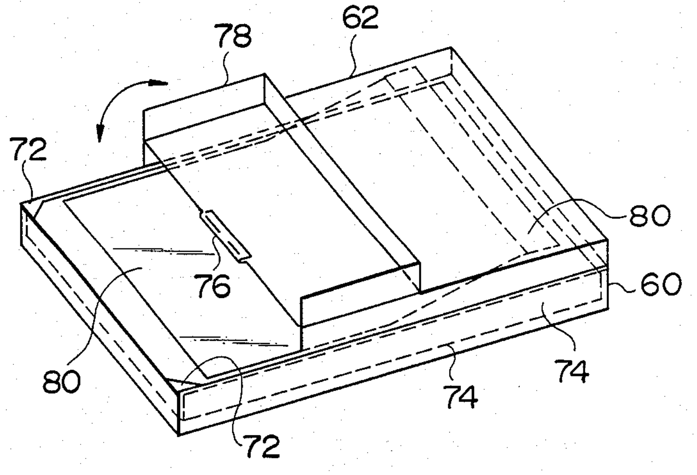
FIG. 3 is a perspective view of a paper feed magazine used for the laser plate-making apparatus according to the present invention.
Figure 4:
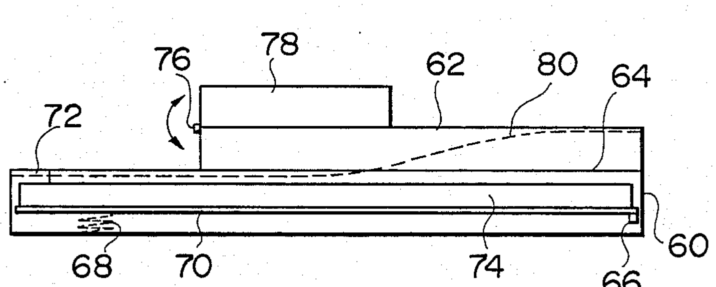
FIG. 4 is a sectional view of the paper feed magazine in FIG. 3.

Paper feed magazine 12 will be described in detail with reference to the perspective view shown in FIG. 3 and the sectional view shown in FIG. 4. Storage case 60 constituting a magazine body is a flat box-type container, and upper lid 62 covers the upper portion thereof. Though not shown in the drawings, the bottom of the case 60 is not flat but it is formed so as to be gradually shallower near main body 10.

Seal member 64 of a relatively elastic material such as rubber is provided to a portion where storage case 60 and upper lid 62 are engaged with each other, thereby preventing moisture permeation.

Push-up plate 70 is arranged inside the storage case 60 near the bottom surface thereof such that one edge portion of push-up plate 70 is pivotally supported by support rod 66 arranged at a portion corresponding to the trailing end of a feed direction of the plate material, while the leading end is biased upward by spring 68 mounted inside storage case 60 on a front portion of the bottom surface thereof. Lock plates 72 are arranged on both sides of the leading end of case 60 corresponding to a portion where the leading end of push-up plate 70 is pushed up, or on its front corners to extend slightly inward from the case side walls. Lock plates 72 serve to lock push-up plate 70 pushed up by spring 68 or the leading ends of stacked plate materials 74. After the leading ends of plate materials 74 are biased upward and stacked inside case 60, the upper edges of the side walls of case 60 are engaged with the lower edges of the side walls of upper lid 62. Lock portions are arranged at several positions of these engaging portions to maintain the engaging state as needed. Opening/closing portion 78 is coupled to the front (when viewed in the feed direction) of upper lid 62 and is freely opened and closed, using hinge 76.

When paper feed magazine 12 is to be set in the plate-making apparatus, opening/closing portion 78 is open and pickup roller 16 (FIG. 1) is brought into contact with the leading end portion of the uppermost plate material 74 to pick up plate material 74.

The entire uppermost surface of plate material 74 in storage case 60 is coated with moistureproof sheet 80 made of a hard or soft synthetic resin having a thickness of 0.01 to 0.5 mm. One end of moistureproof sheet 80 is fixed on an inner upper surface of the rear end portion of upper lid 62. The width of moistureproof sheet 80 substantially corresponds to the inner width of storage case 60, so that both sides contact the inner side walls of case 60. Since the pick-up roller is brought into contact with a plate material at a position 1 to 2 cm inward from the leading end thereof, a pickup area is formed where moistureproof sheet 80 does not cover the plate materials.

Figure 5:
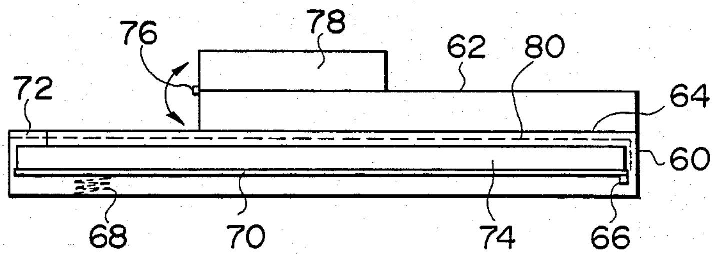
FIG. 5 is a sectional view showing a modification of the paper feed magazine in FIG. 3.

As shown in FIG. 5, moistureproof sheet 80 may be fixed on the inner wall of the rear end of storage case 60 to cover the upper surface of the uppermost plate material and the trailing ends of plate materials 74.

Evaporation of moisture contained in the paper base of the plate material and a decrease in humidity of the stacked plate materials can be restricted by moistureproof sheet 80 and seal member 64. As a result, even if paper feed magazine 12 storing the plate materials is kept set in the plate-making apparatus for a long period of time, the required water content of a plate material required for exposure and development in the wet type electrophotographic process can be maintained.

Figure 6:
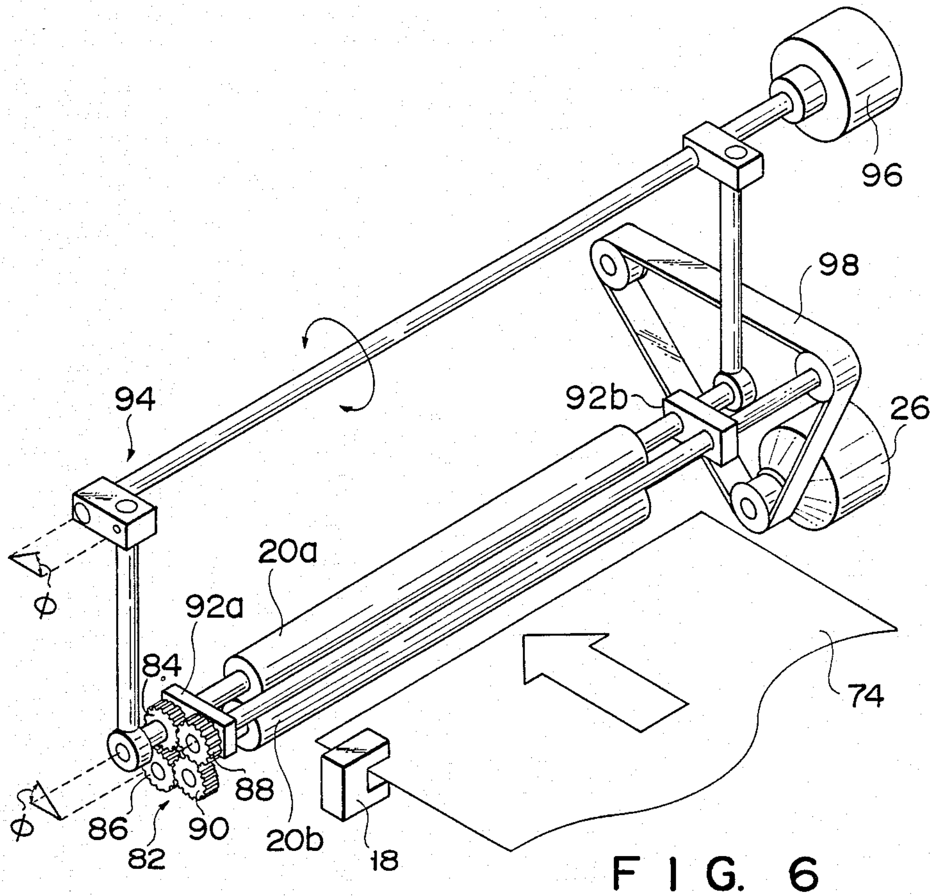
FIG. 6 is a detailed perspective view showing a part near a first convey roller pair of the laser plate-making apparatus according to the present invention.

FIG. 6 shows a modification of a part near first convey roller pair 20. Upper and lower rollers 20*a* and 20*b* forming first convey roller pair 20 are made of an elastic material such as rubber, and the shafts thereof are parallel to each other, with gear mechanism 82 formed on one end thereof so that rollers 20a and 20b are brought into contact. Gear mechanism 82 comprises gears 84 and 86, which are respectively connected to the shafts of upper and lower rollers 20a and 20b, and gears 88 and 90 coupled to gears 84 and 86. The shafts of upper roller 20a and gear 88 extend through plates 92a and 92b formed on both sides of convey roller pair 20. The shaft of upper roller 20a is connected to rotary solenoid 96 through lift mechanism 94.

The shaft of gear 88 is rotated by DC motor 26 (FIG. 1) through belt 98. Rotation of DC motor 26 is transmitted to each roller of convey roller pair 20 through gear mechanism 82. As a result, the upper and lower rollers are rotated at the same speed, thereby smoothly conveying plate material 74.

Figure 7A:
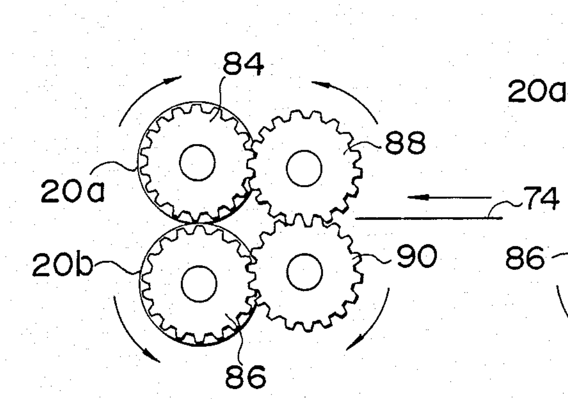
FIGS. 7A and 7B are sectional views for explaining an operation of the first convey roller pair in FIG. 6.
Figure 7B:
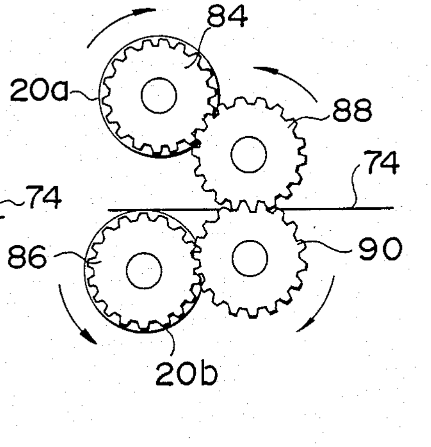

In this embodiment, in order to prevent vibration of plate material 74 at the time when plate material is clamped by convey roller pair 20, when leading end sensor 18 detects that the leading end of plate material 74 passes, rotary solenoid 96 is turned on for a short period of time after a predetermined period of time. When rotary solenoid 96 is turned on, a shaft thereof is turned counterclockwise to move lift mechanism 94 upward by a predetermined distance, and plate 92a is rotated about the shaft of gear 88 through predetermined angle $\phi$. As a result, upper and lower rollers 20a and 20b of convey roller pair are separated from each other. The timing when rotary solenoid 96 is turned on is a timing immediately before when plate material 74 reaches convey roller pair 20. Then, as shown in FIG. 7A, upper and lower rollers 20a and 20b are in contact with each other before plate material 74 is clamped by convey roller pair 20. When plate material 74 is clamped by convey roller pair 20, upper and lower rollers are separated from each other as shown in FIG. 7B. When plate material 74 is sufficiently clamped by convey roller pair 20, rotary solenoid 96 is turned off to bring upper roller 20a into contact with lower roller 20b with plate material 74 therebetween.

As a result, a vibration transmitted to plate material 74 when the material is clamped by convey roller pair 20 can be minimized, thereby preventing a positional error during exposure.

Although it is not shown in the drawings, second convey roller pair 24, squeezing roller pair 34, and discharge roller pair 38 are provided with the same mechanism as described above.

Figure 8:
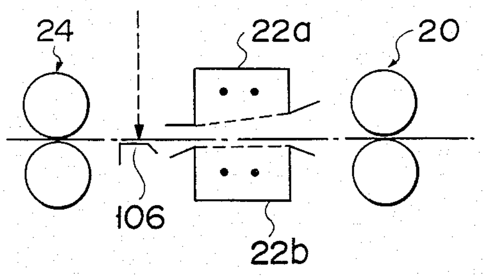
FIG. 8 is a sectional view showing a part near a charger of the laser plate-making apparatus according to the present invention.
Figure 9:
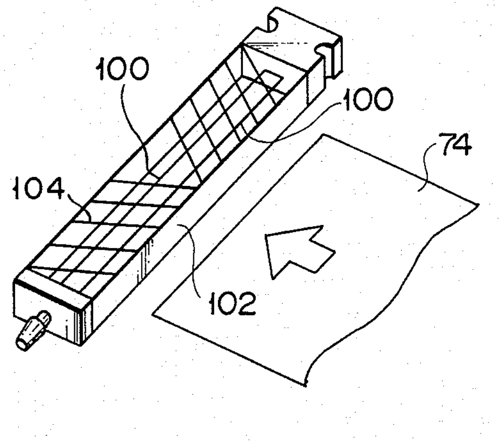
FIG. 9 is a perspective view of the charger.

FIG. 8 shows a sectional view of charger 22. Double charging method for charging from the upper and lower surfaces of the plate material is employed as a method of charging the material so as to quickly and stably perform the electrographic process (charging, exposure, and development). For this reason, charger 22a and 22b are arranged above and below the convey path. As shown in the perspective view of FIG. 9, each of upper and lower chargers 22a and 22b is formed by tungsten wire 100 for generating the electric charge, and aluminum cases 102. Strings 104 are wound around aluminum case 102 to aid stability of a plate material during conveyance. For this reason, the upper surface of the lower aluminum case has substantially no gradient. However, the lower surface of the upper aluminum case has some gradient to allow the plate material to be smoothly conveyed between the upper and lower aluminum cases. Charger 22 positively charges photosensitive layer 56 of the plate material (FIG. 2).

In this embodiment, second convey roller pair 24 is arranged at the downstream side of charger 22 by a very short interval. The laser beam from laser exposing unit 30 is incident on the plate material between charger 22 and second convey roller pair 24. The laser exposure begins after the plate material is clamped by second convey roller pair 24 in order to avoid an out-of-focus stage due to an inclamped state of the plate material. Therefore, a suction mechanism, which should be mounted on support base 106 in the conventional arrangement, is not required in the arrangement according to this embodiment.

Figure 10:
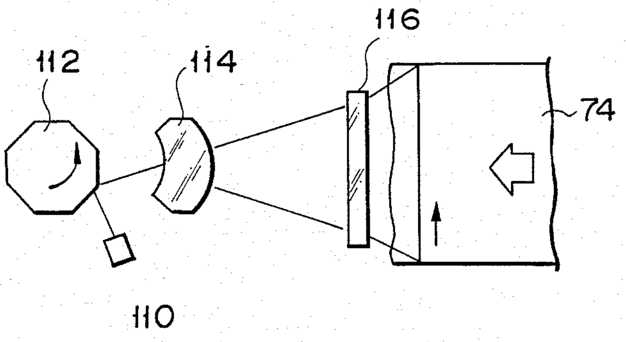
FIG. 10 is a view showing a laser exposing unit of the laser plate-making apparatus according to the present invention.

FIG. 10 shows laser exposing unit 30. A laser emitted from laser 110 (including a collimator lens) is reflected by polygon mirror 112 so that plate material 74 is scanned in the width direction thereof. The laser beam is corrected by an f-$\theta$ lens so that a scanning speed is kept constant, and reflected by reflecting mirror 116 to be incident on the surface of plate material 74 passing through a gap between charger 22 and second convey roller pair 24. A rated output of laser 110 is set to be 1 to 15 mW, depending on the type of plate material. When the plate material is exposed, the positive electric charge, with which photosensitive layer 56 is charged beforehand, is neutralized. A data storage device such as a host computer (not shown) is connected to laser 110, and laser 110 is ON (radiation)/OFF (turn off)-modulated in accordance with image data (binary image data) fed from the data storage device. In this embodiment, the electric charge in a non-image area is neutralized by the laser exposure, and a printing image area (where ink is applied) is kept charged with the positive electric charge because the laser beam is turned off.

Figure 11:
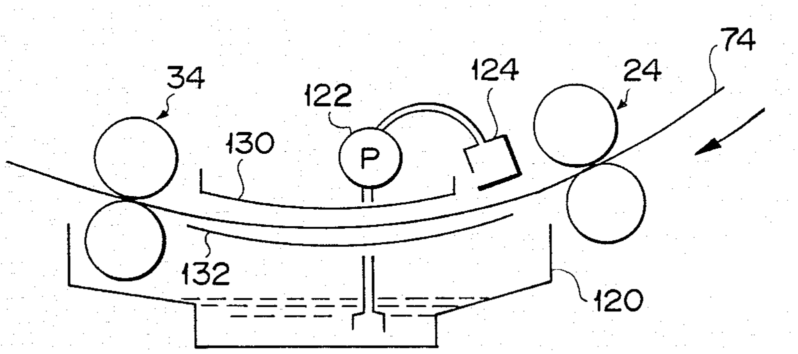
FIG. 11 is a sectional view of a developing unit of the laser plate-making unit according to the present invention.
Figure 12:
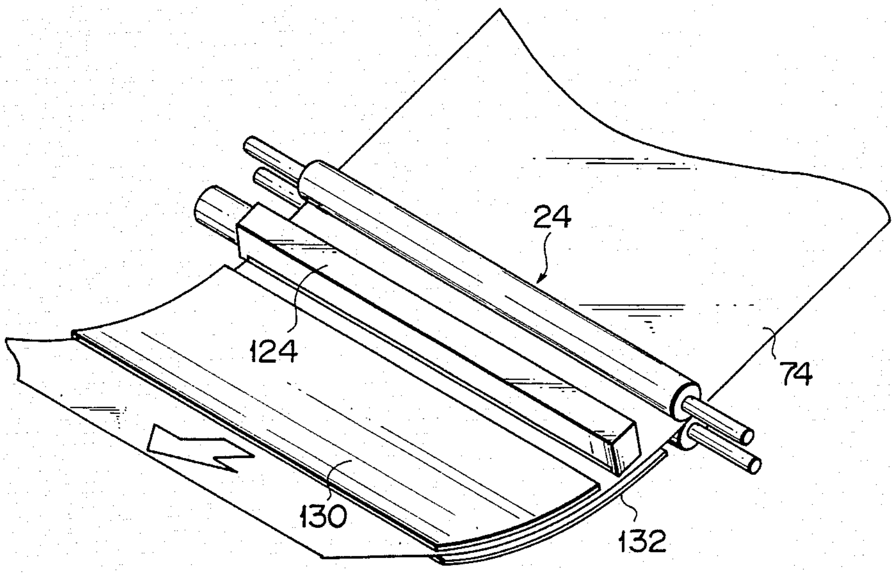
FIG. 12 is a perspective view of the developing unit shown in FIG. 11.

Developing unit 32 will be described with reference to FIG. 11. Developing unit 32 uses the wet developing system and has an opposing pair of arcuated electrodes. Developing unit 32 includes developing solution tank 120 for storing a developing solution which contains a toner. The toner is charged with a negative electric charge beforehand, and is attracted to the printing image area (with the positive electric charge) on which the laser beam is not incident. The developing solution inside tank 120 is pumped out by suction pump 122, and applied to the plate material through discharge pipe 124. The developing solution applied to the plate material drops back into developing solution tank 120.

Developing unit 32 further includes a pair of arcuated opposing electrodes 130 and 132 which are arranged above and below the convey path and are moderately bent along the convey path. The plate material passes between arcuated opposing electrodes 130 and 132. Lower arcuated electrode 132 is grounded, and a predetermined voltage is applied to upper arcuated electrode 130 in accordance with a polarity of the toner or the like so as to generate a vertical electric line of force between arcuated opposing electrodes 130 and 132, thereby facilitating attraction of toner and improving efficiency of development. In addition, since the developing solution is applied downwardly, the plate material is slightly urged against lower arcuated electrode 132, thereby facilitating smooth conveyance of the plate material with a predetermined distance from arcuated electrode 132.

Since the developing unit stores the developing solution, it is located at the lowest position in the convey path, and the convey path is bent at the position of the developing unit. However, since the plate material passes between arcuated opposite electrodes 130 and 132 moderately arcuated along the convey path, the plate material can smoothly pass through the convey path. As a result, even if the trailing end of the plate material is exposed with a laser beam while the leading end thereof passes through the developing unit, no positional error during exposure is caused.

An excess developing solution is squeezed out from the developed plate material by squeezing roller pair 34, and the plate material is then conveyed to drying/fixing unit 36.

Figure 13:
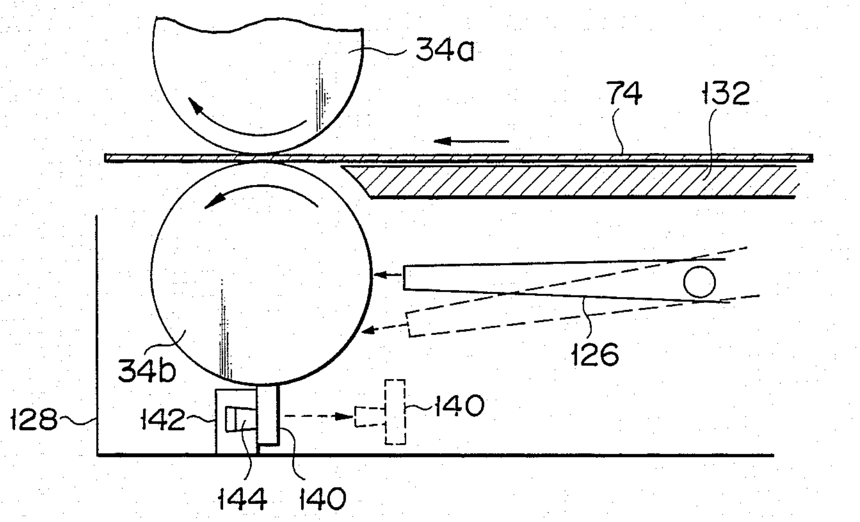
FIG. 13 is a sectional view showing a part near a squeezing roller pair of the developing unit of the laser plate-making apparatus according to the present invention.

FIG. 13 shows a part near squeezing roller pair 34 of developing unit 32 in detail. Each of squeezing roller 34*a* and 34*b* is constituted by metal, rubber, a synthetic resin, or the like. An upper roller 34*a* is a press roller, and lower roller 34*b* is a rotary roller. Some of the developing solution, which circulates for the development process, is always or periodically sprayed on a surface of rotary roller 34*b* by nozzle 126 to wash off the toner which may adhere to the surface of rotary roller 34*b*. Nozzle 126 is connected to a pump (not shown). The upper end of plate-like doctor blade 140 made of an elastic material (synthetic rubber, or a synthetic resin such as polyurethane, foamed urethane, or polyethylene) is in contact with a lower surface of rotary roller 34*b*. Both sides and the lower end of doctor blade 140 are in contact with both side walls and the bottom of recovery tank 128 (formed at the upper portion of developing solution tank 120). Doctor blade 140 is formed by a hard material such as a metal, and at least a blade portion which is brought into contact with rotary roller 34*b* is covered with an elastic material such as rubber.

To clean recovery tank 128 and doctor blade 140, it is preferable that doctor blade 140 is detachably arranged so that punching metal 142 is fixed to the bottom or a side wall of recovery tank 128, and projection 144 tapered toward the distal end thereof is fitted into a recess of punching metal 142.

A flow speed of the developing solution sprayed from nozzle 126 can be easily adjusted by electrically adjusting the air pressure of the pump.

Figure 14:
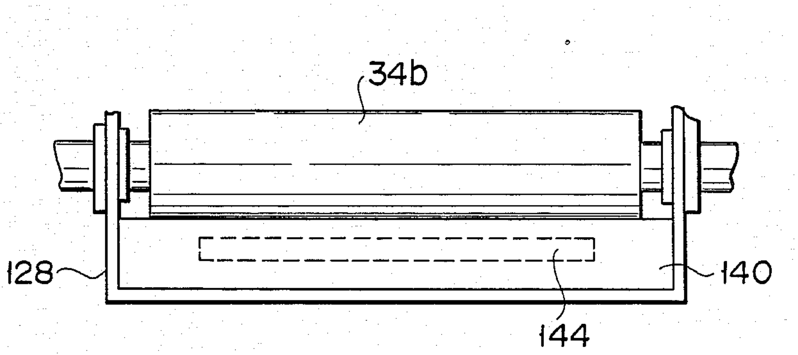
FIG. 14 is a side view of FIG. 13.

FIG. 14 is a front view, wherein the upper portion of doctor blade 140 is in contact with the lower surface of rotary roller 34*b*, while the lower portion of doctor blade 140 is located near the bottom of recovery tank 128 or in tight contact therewith. When doctor blade 140 is in tight contact with the bottom of recovery tank 128, a lining of, e.g., rubber is formed between the lower portion of doctor blade 140 and the bottom of recovery tank 128 so as to provide a sealing function. Recovery tank 128 is divided into two divisions by doctor blade 140 so that a solution which has passed through line contact portion between press roller 34*a* and rotary roller 34*b* and a solution which is sprayed from nozzle 126 and deflected by the surface of rotary roller 34*b* can be kept totally separate from each other. In this case, a discharge port is arranged in each division.

Recovery tank 128 can be divided into two divisions by arranging punching metals 142 to be in tight contact with the bottom and a side wall of recovery tank 128.

Figure 15:
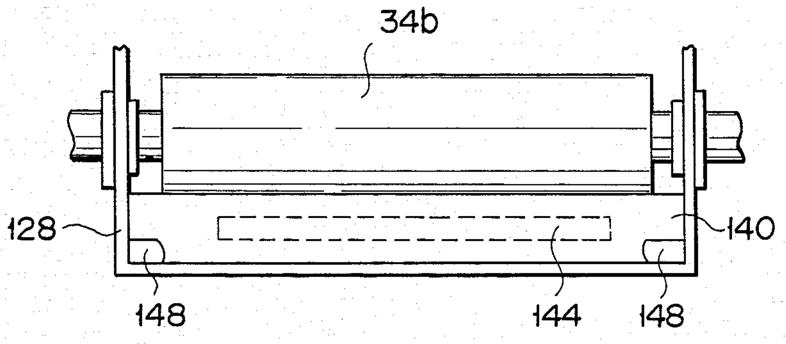
FIG. 15 is a side view of a modification of FIG. 13.

As shown in FIG. 15, communication ports 148 are formed at the lower corners of doctor blade 140 so that an excess developing solution scraped by doctor blade 140 or washed off upon spraying of nozzle 126 can be collected into left or right division of doctor blade 140, and hence discharged.

Figure 16:
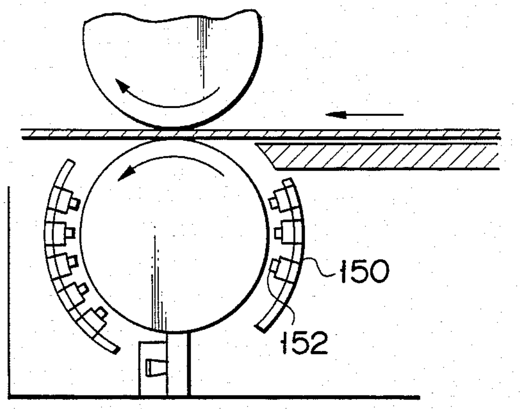
FIG. 16 is a sectional view of another modification of FIG. 13.

FIG. 16 shows a modification of the nozzle, wherein covers 150 may be arranged along and near the surface of rotary roller 34*b*, and a plurality of nozzles 152 may be arranged inside covers 150.

According to such an arrangement, a small amount of developing solution adhering to rotary roller 34*b* after the developing solution is scraped therefrom by doctor blade 140 can be prevented from drying by the developing solution sprayed from nozzle 126, thereby preventing any dried developing solution from being adhered to and deposited on rotary roller 34*b*. Furthermore, by increasing the spray force of the nozzle, the sprayed solution can be used for both wetting of the plate material and cleaning of rotary roller 34*b*. Besides scraping the developing solution from the surface of rotary roller 34*b*, doctor blade 140 can prevent the developing solution from being scattered over dryer 36. If doctor blade 140 is formed of an elastic material, scratches on the surface of rotary roller 34*b* can be prevented.

Figure 17A:
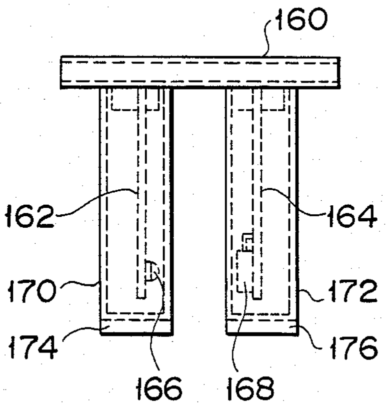
FIGS. 17A and 17B are front and side views, respectively, of a densitometer used for the developing unit.
Figure 17B:
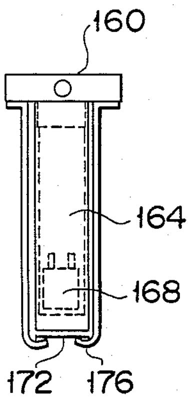

A sensor unit for measuring a concentration of the developing solution is arranged in developing solution tank 120. FIGS. 17A and 1 7B are front and right side views of the sensor unit, respectively. The sensor unit is designed such that two supports 162 and 164 extend downward from base 160, and light-emitting and light-receiving elements 166 and 168 are respectively arranged on supports 162 and 164. A light-emitting diode is used as light-emitting element 166. Special cells 170 and 172 are detachably mounted on supports 162 and 164, respectively, as covers. Special cells 170 and 172 are fixed by cell bands 174 and 176. Each of the upper portions of the cell bands is fixed to base 160 by a screw, and a lower portion thereof is arcuated inward, thereby detachably locking special cells 170 and 172.

Figure 18:
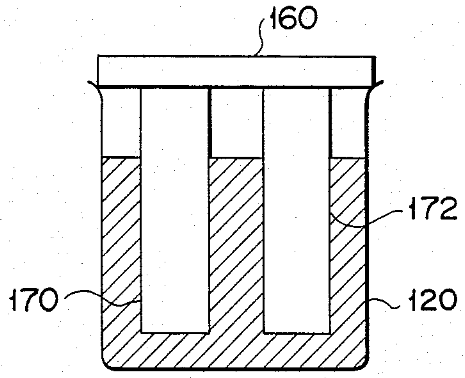
FIG. 18 is a view showing a practical application of the densitometer shown in FIGS.17A and 17B.

FIG. 18 shows a normal measuring state, wherein special cells 170 and 172 are inserted downward into developing solution tank 120 to measure a concentration of the developing solution.

Figure 19:
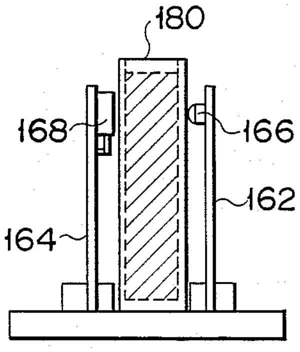
FIG. 19 is a view showing another practical application of the densitometer shown in FIGS.17A and 17B.

FIG. 19 shows a measuring state of the sensor unit when an amount of solution is small, or when it is desired to compare a value indicated by a spectrophotometer with a measured value. FIG. 19 shows a state wherein the cell bands and the special cells are detached. In this case, the sensor unit is set upside down and cell 180 filled with a solution to be measured is disposed between supports 162 and 164 to perform a measuring operation. It is preferable that a light-emitting diode having a specific wavelength, which is determined by experiment, is used for the light-emitting element, a preparation time of the sensor is set to be equal to or shorter than 30 sec., and disposable specific cells can be used and detached with a simple operation, thereby improving operability when the sensor unit becomes dirty.

Since the light-emitting diode is used, an amount of light can be set to be a normal state in a short period of time, and hence measurement can be quickly started. Since the special cells are easily detached and disposable, it is easy to cope with a case wherein the sensor unit becomes dirty. Furthermore, a case wherein the amount of solution is small can be coped with because the special cells are easily detached, and hence the cell containing the solution can be disposed between the supports.

Figure 20:
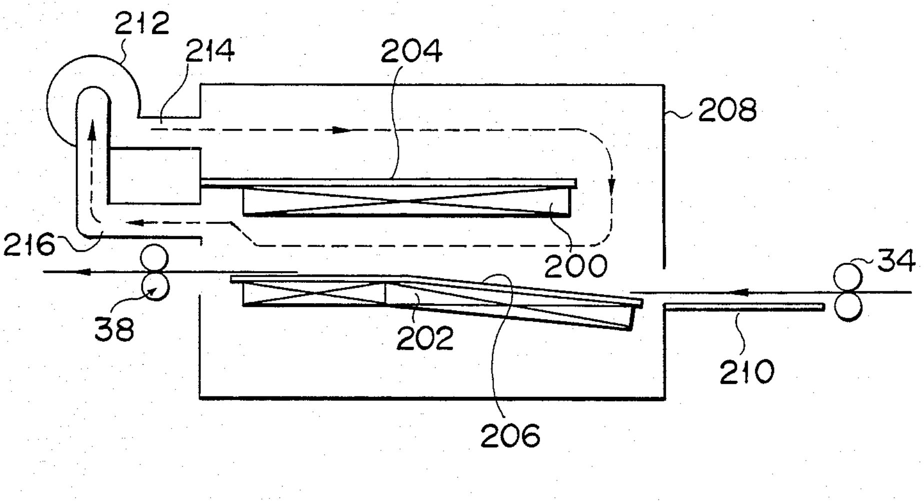
FIG. 20 is a sectional view of a fixing unit of the laser plate-making apparatus according to the present invention.

FIG. 20 shows fixing unit 36 in detail. Panel heaters 200 and 202 are arranged above and below the convey path. Upper panel heater 200 is arranged to be parallel to the convey path, and partition plate 204 is in tight contact with the upper or lower surface of panel heater 200. Guide plate 206 over which the plate material passes is in tight contact with the upper surface of lower panel heater 202. Reference numeral 208 denotes a housing of the fixing unit. Feed guide 210 is arranged at a feed port.

Fan 212 (line flow fan) is arranged on a downstream side of housing 208. Air from fan 212 is blown into housing 208 through air spray port 214, supplied to an upstream side of housing 208 along upper heater 200, heated, turned in the reverse direction, and guided to the surface of the plate material on guide plate 206. Since this hot air is blown in a direction perpendicular to the surface of the plate material at a feed port, the plate material can be urged against guide plate 206, and the lower surface of the plate material can be sufficiently heated and dried by panel heater 202, thereby fixing the plate material by drying. Since the plate material is dried by hot air in this manner, high drying efficiency can be obtained. The hot air guided in the downstream direction while drying the plate material along the convey path returns to an air suction port of fan 212 through air discharge port 216. The flow of the hot air is indicated by a broken line. Since the feed direction of the plate material is the same as the flow direction of the hot air flow, the plate material can be smoothly conveyed along guide plate 206. Since guide plate 206 is not flat; it is bent such that its end close to the inlet port is lower or its end close to the outlet port is higher, air is interposed between the plate material and the guide plate at the bent portion. This prevents the plate material being sucked to the guide plate. The plate material can be dried by panel heater 202 while it is smoothly conveyed over guide plate 206. An appropriate number of convey roller pairs (not shown) for conveying the plate material may be arranged on both sides of the convey path inside housing 208.

Fixing unit 36 is operated in synchronism with developing unit 32. The fixing unit causes fan 212 to start rotating in response to a development start signal from the developing unit, and panel heaters 200 and 202 are heated to a temperature required for fixing by temperature control of a thermostat. In addition, a panel heater power source is kept on by another thermostat even if the plate material is not conveyed, thereby holding a state of preheating temperature control. Fan 212 starts rotating when conveyance of the plate material into the developing unit or the fixing unit is detected.

Figure 21:
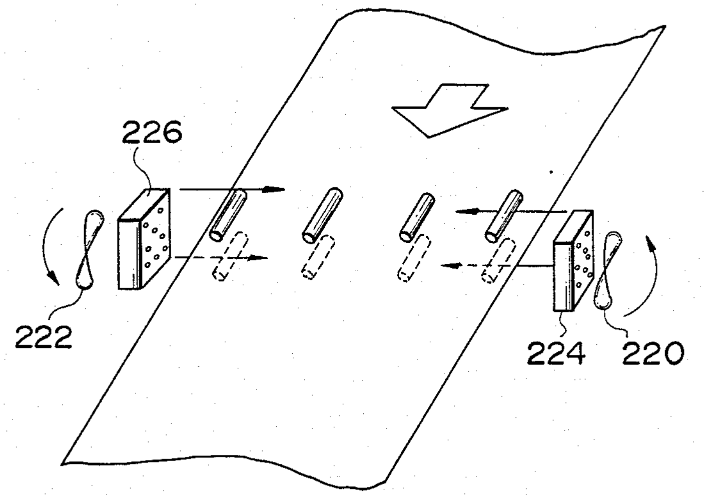
FIG. 21 is a perspective view showing another fixing unit.

FIG. 21 shows another fixing unit 36. In this case, the twin dryer method is employed. Fans 220 and 222 are arranged on both sides of the convey path. Air from these fans is heated by ceramic heaters 224 and 226, and hot air is blown against the plate material from both sides thereof.

As has been described above, according to the present invention, there is provided a compact laser plate-making apparatus capable of producing a high-quality image. Furthermore, the laser plate-making apparatus according to the present invention is capable of preventing a plate material from being vibrated, allowing the plate material to smoothly pass through the developing unit even if a gradient of the convey path is changed at the developing unit, preventing the plate material from being dried even if the paper feed magazine is kept set in the apparatus for a long period of time, preventing the surface of the squeezing roller pair from being dried to prevent toner from being adhered to the surface thereof, and preventing the plate material from losing its flatness because of the air used for efficiently drying the plate material, and easily measures a concentration of the developing solution in the developing unit.

What is claimed is:

1. A laser plate-making apparatus for forming a print image on a plate material for offset printing which is conveyed along a convey path, comprising:

feed magazine means for feeding a plate material;

charger means for charging the plate material fed from said feed magazine means with an electric charge;

exposing means for exposing the plate material charged with the electric charge, using a laser beam modulated in accordance with a plate-making image, and for forming an electrostatic latent image on the plate material by partially neutralizing the electric charge;

developing means for developing the electrostatic latent image by applying a developing solution containing a toner to the plate material exposed with the laser beam, said developing means being located at a lowest position in a convey path, the convey path going down to said developing means and going up therefrom, said developing means including a pair of arcuated electrodes to which a predetermined voltage is applied to generate an electric line of force between said pair of arcuated electrodes and through which the plate material passes; and fixing means for drying the plate material after development and fixing a print image.

2. An apparatus according to claim 1, in which the plate material comprises a paper base, an undercoat coated thereon, a back coat coated on a lower surface of the paper base, and a zinc oxide photosensitive layer coated on an upper surface of the undercoat.

3. An apparatus according to claim 1, in which said feed magazine means comprises a storage case for storing plate materials, an upper lid engaged with said storing case, a seal arranged along a portion where said storage case and said upper lid are engaged with each other, for preventing moisture permeation with respect to said storage case, and a moistureproof sheet of a synthetic resin film for covering an upper surface of an uppermost plate material inside said storage case.

4. An apparatus according to claim 3, in which a rear end of said moistureproof sheet is mounted on and fixed to an inner upper wall of a rear end of said upper lid.

5. An apparatus according to claim 3, in which the rear end of said moistureproof sheet is fixed to an inner wall of a rear end of said storage case to cover the upper surface of the uppermost plate material and trailing ends of the plate materials.

6. An apparatus according to claim 1, in which said convey path includes a conductive support arranged next to said charger means, and said exposing means scans the plate material on said support in a widthwise direction thereof using a laser beam.

7. An apparatus according to claim 1, in which said charger means comprises upper and lower chargers arranged above and below the convey path, and each charger includes a tungsten wire for generating the electric charge, an aluminum case, and a string wound around the aluminum case, a gradient of an upper surface of a lower aluminum case being set to be substantially zero, and a lower surface of an upper aluminum case being slanted such that its upstream end is higher than its downstream end.

8. An apparatus according to claim 1, in which said charger means charges the plate material with a positive electric charge, said exposing means exposes a non-image area with the laser beam to neutralize the portion which is exposed, and said developing means applies a toner charged with a negative electric charge to an image area.

9. An apparatus according to claim 1, in which said developing means comprises a developing solution tank, a suction pump for pumping out the developing solution from said developing solution tank and applying the developing solution to the plate material, and a squeezing roller pair for squeezing out the plate material to which the developing solution is applied.

10. An apparatus according to claim 9, in which said squeezing roller pair comprises an upper press roller and a lower rotary roller, a doctor blade is in contact with an outer surface of said lower rotary roller, and the developing solution is sprayed on the outer surface of the rotary roller from which the developing solution is scraped off by said doctor blade.

11. An apparatus according to claim 9, in which said developing solution tank includes a sensor unit for measuring a concentration of the developing solution, and said sensor unit being provided with two supports extending from a base, light-emitting diode and light-receiving element respectively arranged on these supports, and covers detachably mounted on the supports.

12. An apparatus according to claim 1, in which said fixing means includes a dryer for blowing hot air against the plate material while the plate material is conveyed.

13. An apparatus according to claim 12, in which said dryer includes a pair of panel heaters arranged above and below the convey path, and a line flow fan arranged on one end of one of said panel heaters, for supplying air along said heater to heat the air, and guiding hot air to the surface of the plate material passing between said upper and lower panel heaters.

14. An apparatus according to claim 12, in which said dryer includes fans arranged on both sides of the convey path, and a ceramic heater for heating air blown from said fans.

15. A laser plate-making apparatus for forming a print image on a plate material for offset printing comprising:

feed magazine means for feeding a plate material;

charger means for charging the plate material fed from said feed magazine means with an electric charge;

exposing means for exposing the plate material charged with the electric charge, using a laser beam modulated in accordance with a plate-making image, and for forming an electrostatic latent image on the plate material by partially neutralizing the electric charge;

developing means for developing the electrostatic latent image by applying a developing solution containing a toner to the plate material exposed with the laser beam;

fixing means for drying the plate material after development and fixing a toner image; and convey means for conveying the plate material fed from said paper feed magazine through a convey path sequentially to said charger, said exposing unit, said developing unit, and said fixing unit, said convey means including a pair of convey rollers arranged between the portion to be exposed by said exposing means and said developing means, and a plate material sensor arranged at an upstream side thereof, said convey rollers being separated apart from each other immediately before the plate material is clamped by said convey roller pair and being brought into contact with each other when it is determined that a leading end of the plate material reaches a position between said convey rollers on the basis of an output from said plate material sensor.

16. An apparatus according to claim 15, in which the plate material comprises a paper base, an undercoat coated thereon, a back coat coated on a lower surface of the paper base, and a zinc oxide photosensitive layer coated on an upper surface of the undercoat.

17. An apparatus according to claim 15, in which said feed magazine means comprises a storage case for storing plate materials, an upper lid engaged with said storing case, a seal arranged along a portion where said storage case and said upper lid are engaged with each other, for preventing moisture permeation with respect to said storage case, and a moistureproof sheet of a synthetic resin film for covering an upper surface of an uppermost plate material inside said storage case.

18. An apparatus according to claim 17, in which a rear end of said moistureproof sheet is mounted on and fixed to an inner upper wall of a rear end of said upper lid.

19. An apparatus according to claim 17, in which the rear end of said moistureproof sheet is fixed to an inner wall of a rear end of said storage case to cover the upper surface of the uppermost plate material and trailing ends of the plate materials.

20. An apparatus according to claim 15, in which said convey means comprises a plurality of conve roller pairs in which downstream convey roller pairs have a convey speed slightly higher than that of upstream convey roller pairs so as to apply tension to a plate material which is conveyed.

21. An apparatus according to claim 15, in which said convey path includes a conductive support arranged next to said charger means, and said exposing means scans the plate material on said support in a widthwise direction thereof using a laser beam.

22. An apparatus according to claim 15, in which said charger means comprises upper and lower chargers arranged above and below the convey path, and each charger includes a tungsten wire for generating the electric charge, an aluminum case, and a string wound around the aluminum case, a gradient of an upper surface of a lower aluminum case being set to be substantially zero, and a lower surface of an upper aluminum case being slanted such that its upstream end is higher than its downstream end.

23. An apparatus according to claim 15, in which said charger means charges the plate material with a positive electric charge, said exposing means exposes a non-image area with the laser beam to neutralize the portion which is exposed, and said developing means applies a toner charged with a negative electric charge to an image area.

24. An apparatus according to claim 15, in which said developing means comprises a developing solution tank, a suction pump for pumping out the developing solution from said developing solution tank and applying the developing solution to the plate material, and a squeezing roller pair for squeezing out the plate material to which the developing solution is applied.

25. An apparatus according to claim 24, in which said squeezing roller pair comprises an upper press roller and a lower rotary roller, a doctor blade is in contact with an outer surface of said lower rotary roller, and the developing solution is sprayed on the outer surface of the rotary roller from which the developing solution is scraped off by said doctor blade.

26. An apparatus according to claim 24, in which said developing solution tank includes a sensor unit for measuring a concentration of the developing solution, and said sensor unit being provided with two supports extending from a base, a light-emitting diode and a light-receiving element respectively arranged on these supports, and covers detachably mounted on the supports.

27. An apparatus according to claim 15, in which said fixing means includes a dryer for blowing hot air against the plate material while the plate material is conveyed.

28. An apparatus according to claim 27, in which said dryer includes a pair of panel heaters arranged above and below the convey path, and a line flow fan arranged on one end of one of said panel heaters, for supplying air along said heater to heat the air, and guiding hot air to the surface of the plate material passing between said upper and lower panel heaters.

29. An apparatus according to claim 27, in which said dryer includes fans arranged on both sides of the convey path, and a ceramic heater for heating air blown from said fans.

* * * * *